(12) United States Patent
Wang et al.

(10) Patent No.: US 10,624,097 B2
(45) Date of Patent: Apr. 14, 2020

(54) SIGNAL SENDING AND RECEIVING METHOD AND RELATED DEVICE

(71) Applicant: HUAWEI TECHNOLOGIES CO., LTD., Shenzhen, Guangdong (CN)

(72) Inventors: Da Wang, Beijing (CN); Jian Wang, Beijing (CN); Zhenguo Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 15/742,571

(22) PCT Filed: Jul. 17, 2015

(86) PCT No.: PCT/CN2015/084291
§ 371 (c)(1),
(2) Date: Jan. 8, 2018

(87) PCT Pub. No.: WO2017/011934
PCT Pub. Date: Jan. 26, 2017

(65) Prior Publication Data
US 2018/0206238 A1    Jul. 19, 2018

(51) Int. Cl.
*H04W 72/04*   (2009.01)
*H04L 29/08*   (2006.01)
(Continued)

(52) U.S. Cl.
CPC ... *H04W 72/0466* (2013.01); *H04L 29/06537* (2013.01); *H04L 67/12* (2013.01);
(Continued)

(58) Field of Classification Search
None
See application file for complete search history.

(56) References Cited

U.S. PATENT DOCUMENTS

| | | | |
|---|---|---|---|
| 2015/0092731 A1 | 4/2015 | Aminaka et al. | |
| 2015/0148985 A1 | 5/2015 | Jo | |

(Continued)

FOREIGN PATENT DOCUMENTS

| | | |
|---|---|---|
| CN | 101978756 A | 2/2011 |
| CN | 102438314 A | 5/2012 |

(Continued)

OTHER PUBLICATIONS

International Search Report issued in International Application No. PCT/CN2015/084291 dated Apr. 7, 2016, 17 pages.

(Continued)

*Primary Examiner* — Jutai Kao
(74) *Attorney, Agent, or Firm* — Fish & Richardson P.C.

(57) ABSTRACT

The present disclosure includes example signal sending and receiving methods and related example devices. One example method includes sending, by a first device, a notification signal to a second device on a target transmission resource, where the target transmission resource includes a third transmission resource determined according to a first transmission resource or a fourth transmission resource determined according to a second transmission resource. The first transmission resource is a resource which the first device uses to send first status information of the first device, and the second transmission resource is a resource which is used by the second device to send second status information of the second device.

17 Claims, 6 Drawing Sheets

A first device sends a notification signal to a second device on a target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device — 101

(51) Int. Cl.
*H04L 29/06* (2006.01)
*H04W 8/22* (2009.01)
*H04W 72/06* (2009.01)

(52) U.S. Cl.
CPC ............... *H04L 69/24* (2013.01); *H04W 8/22* (2013.01); *H04W 72/044* (2013.01); *H04W 72/0406* (2013.01); *H04W 72/0453* (2013.01); *H04W 72/06* (2013.01)

(56) References Cited

U.S. PATENT DOCUMENTS

| | | |
|---|---|---|
| 2015/0189656 A1 | 7/2015 | Iwai et al. |
| 2016/0044678 A1* | 2/2016 | Kwon .................. H04W 76/14 370/329 |
| 2017/0280331 A1 | 9/2017 | Gou et al. |

FOREIGN PATENT DOCUMENTS

| | | |
|---|---|---|
| CN | 102893652 A | 1/2013 |
| CN | 103338497 A | 10/2013 |
| CN | 104301273 A | 1/2015 |
| CN | 104427617 A | 3/2015 |
| CN | 104678832 A | 6/2015 |
| WO | 2014075299 A1 | 5/2014 |

OTHER PUBLICATIONS

Office Action issued in Chinese Application No. 201580080698.5 dated Jul. 3, 2019, 7 pages.

* cited by examiner

A first device sends a notification signal to a second device on a target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device  ⎯ 101

FIG. 1

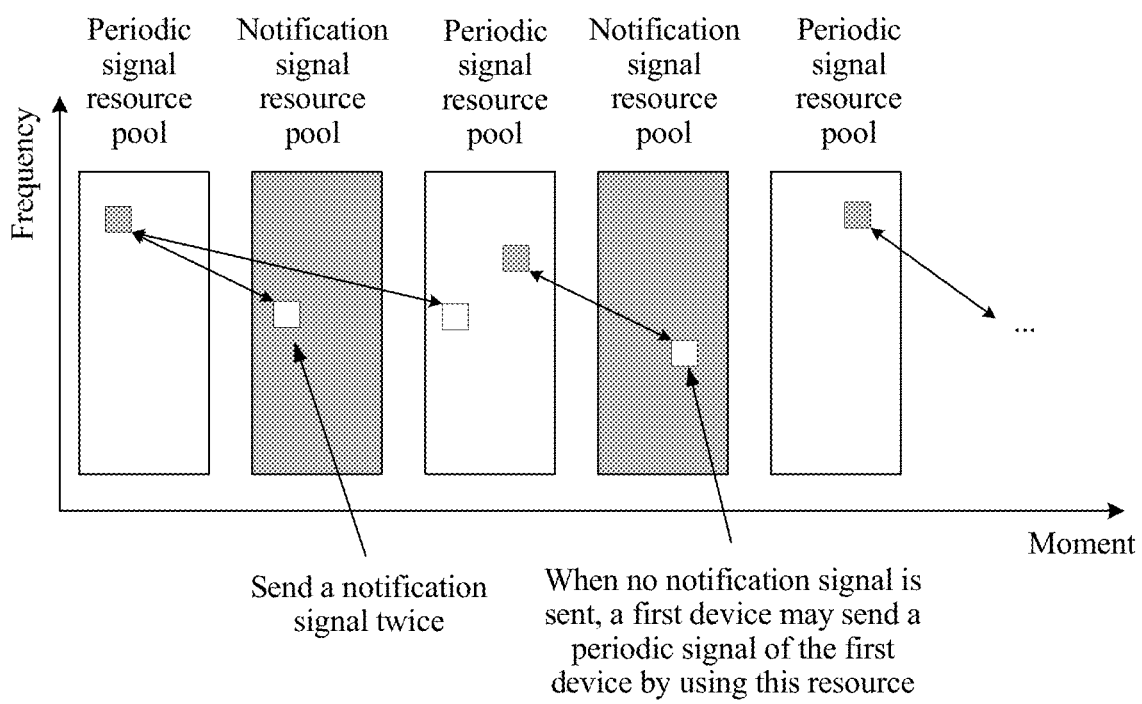

FIG. 1-1

A second device receives, on a target transmission resource, a notification signal sent by a first device, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device — 201

FIG. 2

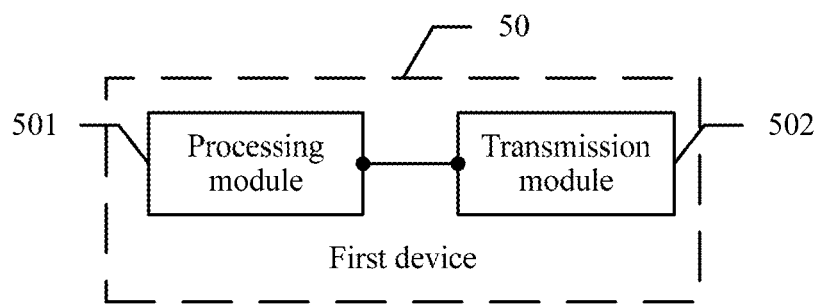

FIG. 3

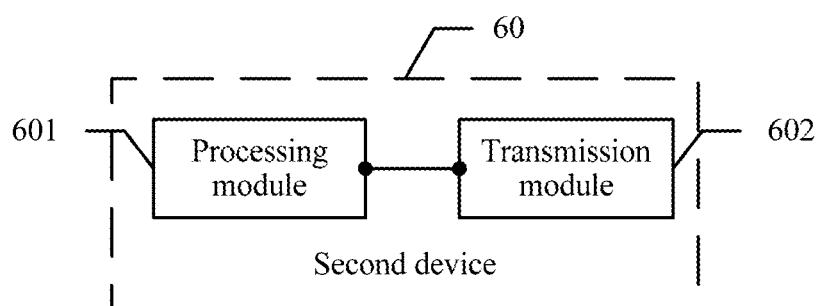

FIG. 4

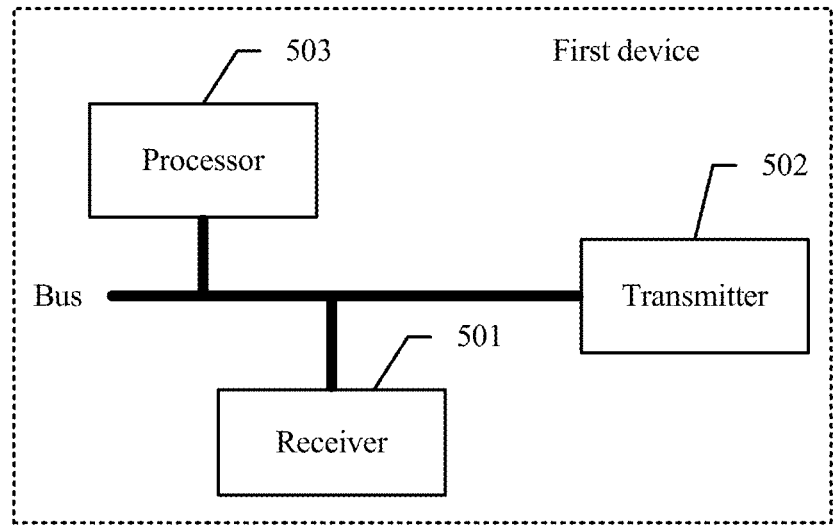

FIG. 5

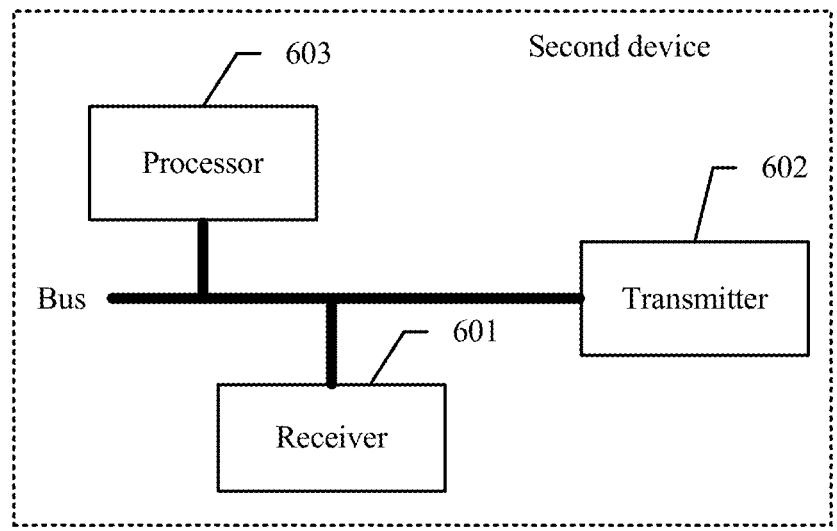

FIG. 6

A first device scrambles a notification signal by using any two of a first identifier, a second identifier, or a third identifier, where the first identifier is an identifier of the first device, the second identifier is an identifier of the notification signal, the third identifier is an identifier of a second device, and the second device is a device that receives the notification signal — 701

FIG. 7

A second device descrambles a notification signal by using any two of a first identifier, a second identifier, or a third identifier, where the first identifier is an identifier of a first device, the second identifier is an identifier of the notification signal, the third identifier is an identifier of the second device, and the first device is a device that sends the notification signal — 801

FIG. 8

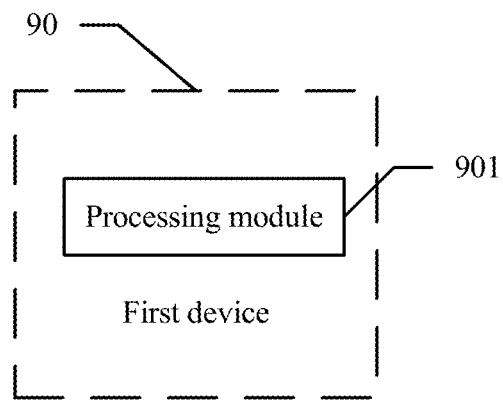

FIG. 9

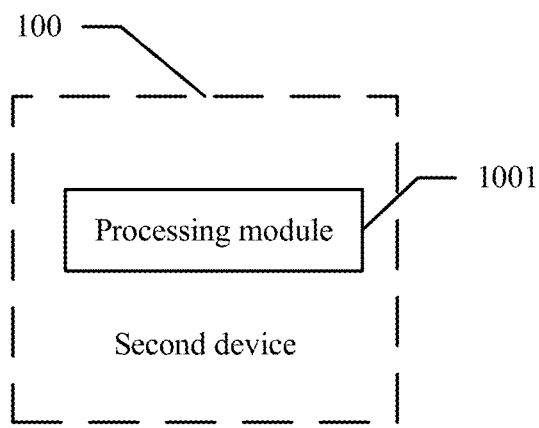

FIG. 10

SIGNAL SENDING AND RECEIVING METHOD AND RELATED DEVICE

CROSS-REFERENCE TO RELATED APPLICATIONS

This application is a national stage of International Application No. PCT/CN2015/084291, filed on Jul. 17, 2015, which is hereby incorporated by reference in its entirety.

TECHNICAL FIELD

The present invention relates to the field of wireless communications technologies, and in particular, to a signal sending and receiving method and a related device.

BACKGROUND

In a vehicle to vehicle (V2V, Vechicle to Vechicle) communications system, any vehicle may exchange data with a surrounding vehicle in a broadcast or unicast manner. A device sends a V2V signal in the broadcast manner, so as to efficiently transfer a signal and improve network flexibility. The V2V signal is a periodic broadcast signal, and includes vehicle status information such as a vehicle identifier, location information, a speed, an acceleration, or a running route.

In the V2V communications system, a vehicle sends a periodic signal of the vehicle according to a transmission pattern, and receives a periodic signal sent by another vehicle, so that vehicles can find each other. In a vehicle running process, a vehicle in a region may suddenly change a running direction or speed because of various environment factors, human factors, or the like, and therefore, may collide with another vehicle in a specific physical distance in a specific time, causing an accident.

To resolve the foregoing problem, in the prior art, a reference vehicle receives a periodic signal from another vehicle, and determines information such as a location or a speed of a surrounding vehicle. When the reference vehicle suddenly changes a running direction or a speed because of various environment factors, human factors, or the like, the reference vehicle sends a signal to a surrounding target vehicle in a relatively short time, for example, a vehicle that may collide with the reference vehicle. The signal is a notification signal of a relatively high priority, for example, an alarm (FCW, Forward collision Warning) signal. Therefore, the vehicle that may collide with the reference vehicle performs a corresponding action (such as emergently brakes, changes a running direction, or decreases a running speed) after receiving the FCW signal, so as to reduce a collision probability of the vehicle that may collide with the reference vehicle, and reduce a traffic accident.

However, in the prior art, the vehicle that may collide with the reference vehicle knows neither a time at which the reference vehicle sends the notification signal of a high priority, for example, an FCW signal, nor a resource on which the signal can be received. Consequently, the target vehicle, for example, the vehicle that may collide with the reference vehicle has a relatively long delay in receiving the notification signal of a high priority, or even cannot receive the signal. This method is not reliable.

SUMMARY

The present invention provides a signal sending and receiving method and a related device, so as to reduce a delay in receiving a notification signal and improve reliability of the notification signal.

A first aspect of the present invention provides a signal sending method, and the method includes:

sending, by a first device, a notification signal to a second device on a target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device.

With reference to the first aspect, in a first implementation of the first aspect of the present invention, a frequency corresponding to a transmission resource is a frequency domain location corresponding to the transmission resource in a resource pool, a moment corresponding to the transmission resource is a time domain location corresponding to the transmission resource in the resource pool, and a first frequency domain location $P_1$ corresponding to the target transmission resource in the resource pool is as follows:

$P_1 = \text{mod}(P_2 + \text{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

With reference to the first aspect, in a second implementation of the first aspect of the present invention, a sixth time domain location $T_1$ corresponding to the target transmission resource in a resource pool is as follows:

$T_1 = \text{mod}(T_2 + \text{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

With reference to the first aspect, in a third implementation of the first aspect of the present invention, when the target transmission resource is the third transmission resource, an eleventh frequency domain location $P_3$ corresponding to the target transmission resource in a resource pool is as follows:

$P_3 = \mathrm{mod}(P_4 + \mathrm{Delta}, N_2)$, where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3 = \mathrm{mod}(T_4 + \mathrm{Delta}, M_2)$, where $T_4$ is a time domain location corresponding to the first transmission resource in the resource pool, Delta is an increment, and $M_2$ is a total quantity of available moment locations in the resource pool; or when the target transmission resource is the fourth transmission resource, a thirteenth frequency domain location $P_5$ corresponding to the target transmission resource in a resource pool is as follows:

$P_5 = \mathrm{mod}(P_6 + \mathrm{Delta}, N_3)$, where $P_6$ is a frequency domain location corresponding to the second transmission resource in the resource pool, Delta is an increment, and $N_3$ is a total quantity of available frequency locations in the resource pool; and a fourteenth time domain location $T_5$ corresponding to the target transmission resource in the resource pool is as follows:

$T_5 = \mathrm{mod}(T_6 + \mathrm{Delta}, M_3)$, where $T_6$ is a time domain location corresponding to the second transmission resource in the resource pool, Delta is an increment, and $M_3$ is a total quantity of available moment locations in the resource pool.

With reference to any one of the first aspect, or the first to the third implementations of the first aspect, in a fourth implementation of the first aspect of the present invention, the sending a notification signal to a second device on a target transmission resource includes:

within each period in which the first transmission resource by using which the first device sends the first status information does not change, sending, by the first device, the notification signal by using the third transmission resource; or within each period in which the second transmission resource by using which the second device sends the second status information does not change, sending, by the first device, the notification signal by using the fourth transmission resource.

With reference to any one of the first aspect, or the first to the fourth implementations of the first aspect, in a fifth implementation of the first aspect of the present invention, before the sending, by a first device, a notification signal to a second device on a target transmission resource, the method further includes:

scrambling, by the first device, the notification signal according to any two of a first identifier, a second identifier, or a third identifier, to obtain a scrambled notification signal, where the first identifier is an identifier of the first device, the second identifier is an identifier of the notification signal, the third identifier is an identifier of the second device, and the second device is a device that receives the notification signal; and the sending, by a first device, a notification signal to a second device on a target transmission resource includes:

sending, by the first device, the scrambled notification signal to the second device by using the third transmission resource or the fourth transmission resource.

With reference to the fifth implementation of the first aspect, in a sixth implementation of the first aspect of the present invention, the scrambling, by the first device, the notification signal according to any two of a first identifier, a second identifier, or a third identifier includes:

generating, by the first device, a scrambling code sequence according to a scrambling code seed, and scrambling the notification signal by using the scrambling code sequence, where the scrambling code seed is generated according to any two identifiers of the first identifier, the second identifier, or the third identifier.

With reference to the sixth implementation of the first aspect, in a seventh implementation of the first aspect of the present invention, the notification signal includes a verification code field, and the scrambling the notification signal by using the scrambling code sequence includes:

scrambling, by the first device, the verification code field by using the scrambling code sequence.

A second aspect of the present invention provides a signal receiving method, and the method includes:

receiving, by a second device on a target transmission resource, a notification signal sent by a first device, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device.

With reference to the second aspect, in a first implementation of the second aspect of the present invention, a first frequency domain location $P_1$ corresponding to the target transmission resource in a resource pool is as follows:

$P_1 = \mathrm{mod}(P_2 + \mathrm{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

With reference to the second aspect, in a second implementation of the second aspect of the present invention, a sixth time domain location $T_1$ corresponding to the target transmission resource in the resource pool is as follows:

$T_1 = \mathrm{mod}(T_2 + \mathrm{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

With reference to the second aspect, in a third implementation of the second aspect of the present invention, when the target transmission resource is the third transmission resource, an eleventh frequency domain location $P_3$ corresponding to the target transmission resource in a resource pool is as follows:

$P_3 = \mod(P_4 + \text{Delta}, N_2)$, where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3 = \mod(T_4 + \text{Delta}, M_2)$, where $T_4$ is a time domain location corresponding to the first transmission resource in the resource pool, Delta is an increment, and $M_2$ is a total quantity of available moment locations in the resource pool; or when the target transmission resource is the third transmission resource, a thirteenth frequency domain location $P_5$ corresponding to the target transmission resource in a resource pool is as follows:

$P_5 = \mod(P_6 + \text{Delta}, N_3)$, where $P_6$ is a frequency domain location corresponding to the second transmission resource in the resource pool, Delta is an increment, and $N_3$ is a total quantity of optional frequencies in the resource pool; and a fourteenth time domain location $T_5$ corresponding to the target transmission resource in the resource pool is as follows:

$T_5 = \mod(T_6 + \text{Delta}, M_3)$, where $T_6$ is a time domain location corresponding to the second transmission resource in the resource pool, Delta is an increment, and $M_3$ is a total quantity of available moments in the resource pool.

With reference to any one of the second aspect, or the first to the third implementations of the second aspect, in a fourth implementation of the second aspect of the present invention, the receiving, by a second device on a target transmission resource, a notification signal sent by a first device includes:

within each period in which the first transmission resource by using which the first device sends the first status information does not change, receiving, by the second device, the notification signal on the third transmission resource; or within each period in which the second transmission resource by using which the second device sends the second status information does not change, receiving, by the second device, the notification signal on the fourth transmission resource.

With reference to any one of the second aspect, or the first to the fourth implementations of the second aspect, in a fifth implementation of the second aspect of the present invention, before the receiving, by a second device on a target transmission resource, a notification signal sent by a first device, the method further includes:

descrambling, by the second device, the notification signal according to any two of a first identifier, a second identifier, or a third identifier, to obtain a descrambled notification signal, where the first identifier is an identifier of the first device, the second identifier is an identifier of the notification signal, the third identifier is an identifier of the second device, and the first device is a device that sends the notification signal; and the receiving, by a second device on a target transmission resource, a notification signal sent by a first device includes:

receiving, by the second device, the descrambled notification signal on the target transmission resource.

With reference to the fifth implementation of the second aspect, in a sixth implementation of the second aspect of the present invention, the descrambling, by the second device, the notification signal according to any two of a first identifier, a second identifier, or a third identifier includes:

generating, by the second device, a scrambling code sequence according to a scrambling code seed, and descrambling the notification signal by using the scrambling code sequence, where the scrambling code seed is generated according to any two identifiers of the first identifier, the second identifier, or the third identifier.

With reference to the sixth implementation of the second aspect, in a seventh implementation of the second aspect of the present invention, the notification signal includes a verification code field, and the descrambling the notification signal by using the scrambling code sequence includes:

descrambling, by the second device, the verification code field by using the scrambling code sequence.

A third aspect of the present invention provides a first device, and the first device includes:

a processing module, configured to determine a target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device; and a transmission module, configured to send a notification signal to the second device on the target transmission resource determined by the processing module.

With reference to the third aspect, in a first implementation of the third aspect of the present invention, a frequency corresponding to a transmission resource is a frequency domain location corresponding to the transmission resource in a resource pool, a moment corresponding to the transmission resource is a time domain location corresponding to the transmission resource in the resource pool, and a first frequency domain location $P_1$ corresponding to the target transmission resource in the resource pool is as follows:

$P_1 = \mod(P_2 + \text{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

With reference to the third aspect, in a second implementation of the third aspect of the present invention, a sixth time domain location $T_1$ corresponding to the target transmission resource in a resource pool is as follows:

$T_1=\mathrm{mod}(T_2+\mathrm{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

With reference to the third aspect, in a third implementation of the third aspect of the present invention, when the target transmission resource is the third transmission resource, an eleventh frequency domain location $P_3$ corresponding to the target transmission resource in a resource pool is as follows:

$P_3=\mathrm{mod}(P_4+\mathrm{Delta}, N_2)$, where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3=\mathrm{mod}(T_4+\mathrm{Delta}, M_2)$, where $T_4$ is a time domain location corresponding to the first transmission resource in the resource pool, Delta is an increment, and $M_2$ is a total quantity of available moment locations in the resource pool; or when the target transmission resource is the fourth transmission resource, a thirteenth frequency domain location $P_5$ corresponding to the target transmission resource in a resource pool is as follows:

$P_5=\mathrm{mod}(P_6+\mathrm{Delta}, N_3)$, where $P_6$ is a frequency domain location corresponding to the second transmission resource in the resource pool, Delta is an increment, and $N_3$ is a total quantity of available frequency locations in the resource pool; and a fourteenth time domain location $T_5$ corresponding to the target transmission resource in the resource pool is as follows:

$T_5=\mathrm{mod}(T_6+\mathrm{Delta}, M_3)$, where $T_6$ is a time domain location corresponding to the second transmission resource in the resource pool, Delta is an increment, and $M_3$ is a total quantity of available moment locations in the resource pool.

With reference to any one of the third aspect, or the first to the third implementations of the third aspect, in a fourth implementation of the third aspect of the present invention, the transmission module is further configured to:

within each period in which the first transmission resource does not change, send the notification signal by using the third transmission resource; or within each period in which the second transmission resource does not change, send the notification signal by using the fourth transmission resource.

With reference to any one of the third aspect, or the first to the fourth implementations of the third aspect, in a fifth implementation of the third aspect of the present invention, the processing module is further configured to:

descramble the notification signal according to any two of a first identifier, a second identifier, or a third identifier, to obtain a descrambled notification signal, where the first identifier is an identifier of the first device, the second identifier is an identifier of the notification signal, the third identifier is an identifier of the second device, and the first device is a device that sends the notification signal; and the transmission module is specifically configured to:

send, to the second device by using the third transmission resource or the fourth transmission resource, the scrambled notification signal obtained by the processing module.

With reference to the fifth implementation of the third aspect, in a sixth implementation of the third aspect of the present invention, the processing module is specifically configured to:

generate a scrambling code sequence according to a scrambling code seed, and scramble the notification signal by using the scrambling code sequence, to obtain the scrambled notification signal, where the scrambling code seed is generated according to any two identifiers of the first identifier, the second identifier, or the third identifier.

With reference to the sixth implementation of the third aspect, in a seventh implementation of the third aspect of the present invention, when the notification signal includes a verification code field, the processing module is specifically configured to:

scramble the verification code field by using the scrambling code sequence.

A fourth aspect of the present invention provides a second device, and the second device includes:

a processing module, configured to determine a target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device; and a transmission module, configured to receive, on the target transmission resource determined by the processing module, a notification signal sent by the first device.

With reference to the fourth aspect, in a first implementation of the fourth aspect of the present invention, a first frequency domain location $P_1$ corresponding to the target transmission resource in a resource pool is as follows:

$P_1=\text{mod}(P_2+\text{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

With reference to the fourth aspect, in a second implementation of the fourth aspect of the present invention, a sixth time domain location $T_1$ corresponding to the target transmission resource in a resource pool is as follows:

$T_1=\text{mod}(T_2+\text{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

With reference to the fourth aspect, in a third implementation of the fourth aspect of the present invention, when the target transmission resource is the third transmission resource, an eleventh frequency domain location $P_3$ corresponding to the target transmission resource in a resource pool is as follows:

$P_3=\text{mod}(P_4+\text{Delta}, N_2)$, where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3=\text{mod}(T_4+\text{Delta}, M_2)$, where $T_4$ is a time domain location corresponding to the first transmission resource in the resource pool, Delta is an increment, and $M_2$ is a total quantity of available moment locations in the resource pool; or when the target transmission resource is the third transmission resource, a thirteenth frequency domain location $P_5$ corresponding to the target transmission resource in a resource pool is as follows:

$P_5=\text{mod}(P_6+\text{Delta}, N_3)$, where $P_6$ is a frequency domain location corresponding to the second transmission resource in the resource pool, Delta is an increment, and $N_3$ is a total quantity of optional frequencies in the resource pool; and a fourteenth time domain location $T_5$ corresponding to the target transmission resource in the resource pool is as follows:

$T_5=\text{mod}(T_6+\text{Delta}, M_3)$, where $T_6$ is a time domain location corresponding to the second transmission resource in the resource pool, Delta is an increment, and $M_3$ is a total quantity of available moments in the resource pool.

With reference to any one of the fourth aspect, or the first to the third implementations of the fourth aspect, in a fourth implementation of the fourth aspect of the present invention, the transmission module is specifically configured to:

within each period in which the first transmission resource by using which the first device sends the first status information does not change, receive the notification signal on the third transmission resource; or within each period in which the second transmission resource by using which the second device sends the second status information does not change, receive the notification signal on the fourth transmission resource.

With reference to any one of the fourth aspect, or the first to the fourth implementations of the fourth aspect, in a fifth implementation of the fourth aspect of the present invention, the processing module is further configured to:

descramble the notification signal according to any two of a first identifier, a second identifier, or a third identifier, to obtain a descrambled notification signal, where the first identifier is an identifier of the first device, the second identifier is an identifier of the notification signal, the third identifier is an identifier of the second device, and the first device is a device that sends the notification signal; and the transmission module is specifically configured to:

receive, on the target transmission resource, the descrambled notification signal obtained by the processing module.

With reference to the first implementation of the fourth aspect, in a sixth implementation of the fourth aspect of the present invention, the processing module is specifically configured to: generate a scrambling code sequence according to a scrambling code seed, and descramble the notification signal by using the scrambling code sequence, where the scrambling code seed is generated according to any two identifiers of the first identifier of the first device, the second identifier of the notification signal, or the third identifier of the second device.

With reference to the sixth implementation of the fourth aspect, in a seventh implementation of the fourth aspect of the present invention, when the notification signal includes a verification code field, the processing module is specifically configured to:

descramble the verification code field by using the scrambling code sequence.

It may be learned from the foregoing technical solutions that in the embodiments of the present invention, the first device sends the notification signal to the second device on the third transmission resource determined according to the first transmission resource or on the fourth transmission resource determined according to the second transmission resource, so that the second device effectively receives the notification signal on the third transmission resource or the fourth transmission resource. That is, the first device can send the notification signal to the second device in a timely manner, and the second device can directly receive the notification signal on the third transmission resource or the fourth transmission resource. This reduces an unnecessary receiving delay, and further improves reliability that the second device receives the notification signal.

BRIEF DESCRIPTION OF DRAWINGS

FIG. 1 is a schematic flowchart of a signal sending method according to an embodiment of the present invention;

FIG. 1-1 is a schematic diagram of a change of a corresponding resource pool when a notification signal is sent according to an embodiment of the present invention;

FIG. 1-2 is a schematic diagram of a change of a corresponding resource pool when a notification signal is sent according to an embodiment of the present invention;

FIG. 1-3 is a schematic diagram of a change of a corresponding resource pool when a notification signal is sent according to an embodiment of the present invention;

FIG. 2 is a schematic flowchart of a signal receiving method according to an embodiment of the present invention;

FIG. 3 is a schematic structural diagram of a first device according to an embodiment of the present invention;

FIG. 4 is a schematic structural diagram of a second device according to an embodiment of the present invention;

FIG. 5 is another schematic structural diagram of a first device according to an embodiment of the present invention;

FIG. 6 is another schematic structural diagram of a second device according to an embodiment of the present invention;

FIG. 7 is a schematic flowchart of a signal processing method according to an embodiment of the present invention;

FIG. 8 is another schematic flowchart of a signal processing method according to an embodiment of the present invention;

FIG. 9 is another schematic structural diagram of a first device according to an embodiment of the present invention; and FIG. 10 is another schematic structural diagram of a second device according to an embodiment of the present invention.

DESCRIPTION OF EMBODIMENTS

Figures 1, 2:
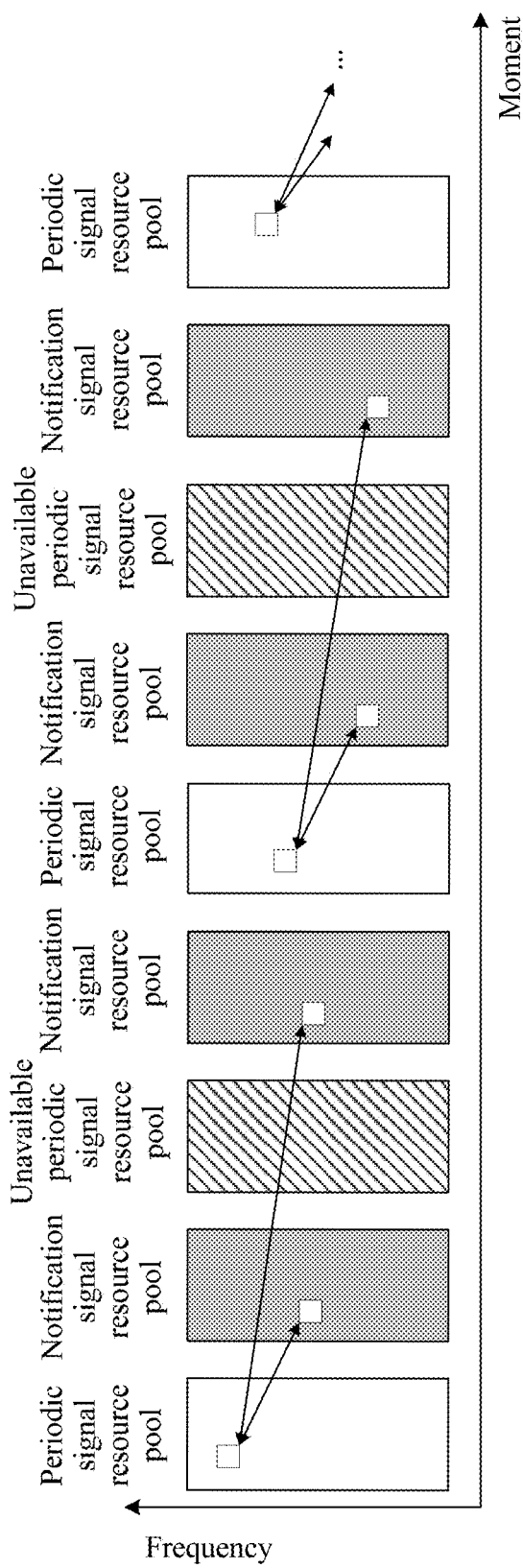

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments derived by persons skilled in the art based on the embodiments of the present invention shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include", "have", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this specification is merely logical division, and there may be another division during implementation in actual application. For example, multiple modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or another form, and this is not limited in this specification. In addition, modules or sub-modules described as separate components may be or may not be physically separated, or may be or may not be physical modules, or may not be grouped into multiple circuit modules. Objectives of the solutions of the embodiments of the present invention may be achieved by selecting some or all of the modules according to actual requirements.

The embodiments of the present invention provide a signal sending and receiving method and a related device, to reduce a delay in receiving a notification signal and improve reliability of the notification signal. The device in this specification may be understood as any device moving in a region, such as a vehicle running in a lane, a flight device flying in the sky, or a ship steering in a navigation channel; or may be extended to a high-speed moving device similar to an orbiting satellite. A specific application scenario is not limited in this specification.

In this specification, a device in a region sends status information of the device or another signal by using a transmission resource in a resource pool. A frequency corresponding to the transmission resource is a frequency domain location corresponding to the transmission resource in the resource pool, and a moment corresponding to the transmission resource is a time domain location corresponding to the transmission resource in the resource pool. When selecting a transmission resource by using a transmission pattern, each device in the region correspondingly selects the transmission resource according to the transmission pattern.

In this specification, a first device and a second device can obtain, by means of calculation in advance, a location of a resource for sending a notification signal by each other, so as to effectively and correctly receive the notification signal at the location, and avoid a relatively long delay caused by blindly detecting the notification signal.

Referring to FIG. 1, FIG. 1 shows a signal sending method, and the method includes the following step:

101. A first device sends a notification signal to a second device on a target transmission resource.

The target transmission resource includes: a third transmission resource determined according to a first transmission resource, or a fourth transmission resource determined according to a second transmission resource. The first transmission resource is a resource by using which the first device sends first status information of the first device, and the second transmission resource is a resource by using which the second device sends second status information of the second device.

The notification signal may be a signal that has a relatively high priority, requires a relatively short delay, or requires relatively high reliability, for example, alarm information, an indication message, or exchange information, such as an FCW signal or a coordination signal between devices. Specifically, the notification signal may be determined according to a service type in actual application, and is not limited in this specification.

The third transmission resource or the fourth transmission resource may be independently configured by a third party device to send the notification signal, or may be another resource used to send status information (another device needs to avoid using a location of the resource).

In actual application, when the notification signal is an alarm signal, there are mainly two cases in which the first device needs to send the alarm signal to the second device:

1. The first device may receive status information sent by another device in a region. The first device determines, according to the received second status information sent by the second device, whether the second status information meets a preset alarm triggering condition. For example, a factor such as a sudden increase in a moving speed or a sudden change in a moving direction of the second device may cause a collision between the second device and the first device in a specific time or distance. In this case, the first device needs to send the alarm signal to the second device, to instruct the second device to perform a corresponding operation according to the alarm signal, for example, perform deceleration, change a moving direction, or perform an emergency stop.

2. The first device may collide with the second device because of emergency braking, a sudden decrease in a moving speed, a sudden change in a moving direction, or the like. The second device may be a device near the first device. In this case, the first device also needs to send the alarm signal to the second device, to instruct the second device to perform a corresponding operation according to the alarm signal, for example, perform deceleration, change a moving direction, or perform an emergency stop.

In the case 1 or 2, a delay of the alarm signal is reduced, so as to effectively reduce a probability of the collision between the first device and the second device to an extent.

In this embodiment of the present invention, the first device sends the notification signal on the third transmission resource or the fourth transmission resource, so that the second device can directly receive the notification signal on the third transmission resource or the fourth transmission resource. This reduces an unnecessary receiving delay, and further improves reliability of receiving the notification signal by the second device.

Optionally, based on the embodiment corresponding to FIG. 1, in a first optional embodiment of this embodiment of the present invention, a relationship between the third transmission resource and the first transmission resource or a relationship between the fourth transmission resource and the second transmission resource includes one of the following cases:

1. A first frequency domain location $P_1$ corresponding to the target transmission resource in the resource pool is obtained according to the following formula:

$P_1 = \mod(P_2 + \text{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

2. A sixth time domain location $T_1$ corresponding to the target transmission resource in the resource pool is obtained according to the following formula:

$T_1 = \mod(T_2 + \text{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

3. An eleventh frequency domain location $P_3$ corresponding to the target transmission resource in the resource pool is obtained according to the following formula:

$P_3 = \mod(P_4 + \text{Delta}, N_2)$, where $P_4$ is a frequency domain location corresponding to the first transmission resource in the resource pool, Delta is an increment, $N_2$ is a total quantity of optional frequencies in the resource pool, and mod is a modulo function; and a twelfth time domain location $T_3$ corresponding to the target transmission resource in the resource pool is obtained according to the following formula:

$T_3 = \mod(T_4 + \text{Delta}, M_2)$, where $T_4$ is a time domain location corresponding to the first transmission resource in the resource pool, Delta is an increment, and $M_2$ is a total quantity of available moments in the resource pool.

4. A thirteenth frequency domain location $P_5$ corresponding to the target transmission resource in the resource pool is obtained according to the following formula:

$P_5 = \mod(P_6 + \text{Delta}, N_3)$, where $P_6$ is a frequency domain location corresponding to the second transmission resource in the resource pool, Delta is an increment, and $N_3$ is a total quantity of optional frequencies in the resource pool; and a fourteenth time domain location $T_5$ corresponding to the target transmission resource in the resource pool is obtained according to the following formula:

$T_5 = \mod(T_6 + \text{Delta}, M_3)$, where $T_6$ is a time domain location corresponding to the second transmission resource in the resource pool, Delta is an increment, and $M_3$ is a total quantity of available moments in the resource pool.

Optionally, based on the embodiment corresponding to FIG. 1, in a second optional embodiment of this embodiment of the present invention, that a first device sends a notification signal to a second device on a target transmission resource includes:

within each period in which the first transmission resource does not change, sending, by the first device, the notification signal by using the third transmission resource; or within each period in which the second transmission resource does not change, sending, by the first device, the notification signal by using the fourth transmission resource.

Availability of a resource pool configured for a device is related to a moving speed of the device. Therefore, within each period in which the first transmission resource does not change, there are three main cases in which the first device sends the notification signal by using the third transmission resource.

a. When the moving speed is not less than a first threshold, the device can normally use a transmission resource allocated to the device in the resource pool.

As shown in FIG. 1-1, within a next period, when the first device selects a new transmission resource, the first device may send the notification signal by using a target transmission resource corresponding to the new transmission resource, so as to improve reliability of the notification signal.

b. When the moving speed is less than a first threshold and greater than a second threshold, the device cannot use an allocated transmission resource in the resource pool at intervals of one period.

As shown in FIG. 1-2, the first device cannot use a transmission resource configured for a next period. That is, the first transmission resource does not change (which is not described again subsequently), but a correspondingly configured notification signal resource pool of the transmission resource configured for the next period is still available. Therefore, it is equivalent to that two notification signal resource pools are configured for the first device in each period, that is, the first device may consecutively retransmit the notification signal twice, to further improve reliability of the notification signal.

c. When the moving speed is not greater than a second threshold, the device cannot use an allocated transmission resource in the resource pool in last three periods in every four periods.

Figures 1, 2, 3:
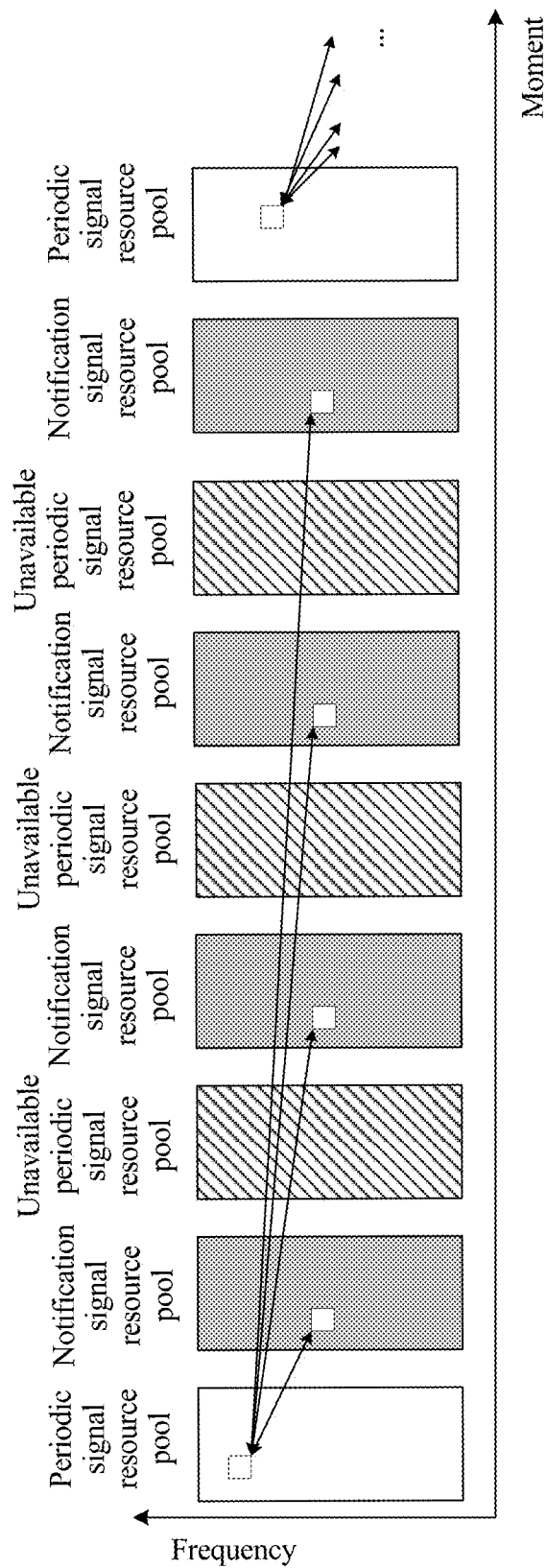

As shown in FIG. 1-3, the first device cannot use transmission resources configured for next three consecutive periods. That is, the first transmission resource does not change, and notification signal resource pools correspondingly configured for the transmission resources configured for the next three consecutive periods are still available. Therefore, it is equivalent to that four notification signal resource pools are configured for the first device in each period, that is, the first device may consecutively retransmit the notification signal for four times, to further improve reliability of the notification signal.

A quantity of times of sending the notification signal may be generalized to $2^n$ according to the content described in a, b, and c. Details are not described.

That a transmission resource by using which the first device sends the first status information does not change may be periodic. Specifically, whether the transmission resource changes is determined according to an actual moving speed of the first device. The transmission resource may not change in N consecutive periods, where N may change, and N is a positive integer. A specific scenario is not described.

Likewise, within each period in which the second transmission resource does not change, the first device sends the notification signal by using the fourth transmission resource. A transmission resource used by the second device is also related to a moving speed of the second device. For details, refer to the foregoing descriptions of the first device.

It should be noted that in FIG. 1-1, FIG. 1-2, and FIG. 1-3, a periodic signal resource pool is used to periodically send status information of a device (for example, a V2V signal), and a notification signal resource pool is used to send a notification signal.

Optionally, based on the embodiment corresponding to FIG. 1, or the first or the second optional embodiment, in a third optional embodiment of this embodiment of the present invention, in addition to that a first device sends a notification signal to a second device on a target transmission resource, the method further includes:

when the first device determines, according to the received second status information sent by the second device, that the second status information does not meet a warning triggering condition, sending the first status information or other information related to the first device by using the first transmission resource, the third transmission resource, the fourth transmission resource, or a new transmission resource.

That is, after the first device does not need to send the notification signal, the first device may still use the third transmission resource or the fourth transmission resource to send the first status information or other information related to the first device, or still use the first transmission resource to send the first status information or other information related to the first device, or still use the new transmission resource (the new transmission resource may be selected every period according to an existing transmission pattern) to send the first status information or other information related to the first device. This is not limited in this specification.

Optionally, based on any one of the embodiment corresponding to FIG. 1, or the first to the third optional embodiments, in a fourth optional embodiment of this embodiment of the present invention, before that a first device sends a notification signal to a second device on a target transmission resource, the method further includes:

scrambling, by the first device, the notification signal according to any two of a first identifier, a second identifier, or a third identifier, to obtain a scrambled notification signal, where the first identifier is an identifier of the first device, the second identifier is an identifier of the notification signal, the third identifier is an identifier of the second device, and the second device is a device that receives the notification signal; and that a first device sends a notification signal to a second device on a target transmission resource includes:

sending, by the first device, the scrambled notification signal to the second device by using the third transmission resource or the fourth transmission resource.

The second device descrambles the scrambled notification signal, and after correctly descrambling the scrambled notification signal, performs, according to the notification signal, a corresponding operation on a parameter that is in the second status information and that meets the warning triggering condition.

Optionally, based on the fourth optional embodiment, in a fifth optional embodiment of this embodiment of the present invention, the scrambling, by the first device, the notification signal according to any two of a first identifier, a second identifier, or a third identifier includes:

generating, by the first device, a scrambling code sequence according to a scrambling code seed, and scrambling the notification signal by using the scrambling code sequence, where the scrambling code seed is generated according to any two identifiers of the first identifier, the second identifier, or the third identifier.

Optionally, based on the fifth optional embodiment, in a sixth optional embodiment of this embodiment of the present invention, the notification signal includes a verification code field, and the scrambling the notification signal by using the scrambling code sequence includes:

scrambling, by the first device, the verification code field by using the scrambling code sequence.

For ease of understanding, a specific application scenario is used as an example to describe the signal sending method. Referring to FIG. 1-1, FIG. 1-2, and FIG. 1-3, for example, in this embodiment, a remote vehicle (RV, Remote Vechicle) and a host vehicle (HV, Host Vechicle) run in a same lane. Each of the RV and the HV periodically broadcasts status information. A third party device (for example, an access device such as a base station) configures, for each vehicle, a first resource pool used to periodically send the status information of each vehicle. Each vehicle may select a transmission resource from the first resource pool according to a transmission pattern or control signaling that is sent by the third party device, so as to periodically broadcast status information of the vehicle. In addition, the third party device configures, for each first resource pool used to broadcast status information, a second resource pool required for sending a notification signal (for example, an FCW signal).

For example, if the RV needs to send a notification signal, the RV needs to select a target transmission resource from the second resource pool to send the notification signal. A location of the target transmission resource is determined according to a location of a transmission resource by using which the RV broadcasts the status information of the RV, or determined according to a location of a transmission resource by using which the HV broadcasts the status information of the HV. Therefore, the HV learns of the location of the target transmission resource by using which the RV sends the notification signal.

The FCW signal is used as an example to describe a procedure of sending the FCW signal in the following:

The RV determines, according to the status information of the HV, whether the HV may collide with the RV in a short time (for example, the RV suddenly decelerates or the HV suddenly accelerates). If the RV determines that the HV may collide with the RV in a short time, the RV sends an FCW signal to the HV, and the HV learns of a location of a resource by using which the RV sends the FCW signal. Therefore, the HV can directly, fast, and accurately receive the FCW signal at the location, so as to effectively reduce a receiving delay and improve reliability of receiving the FCW signal.

In addition, to further improve reliability of the FCW signal, the RV may send the FCW signal to the HV for multiple times. A transmission resource configured for the RV in a resource pool is related to a vehicle speed. Therefore, the RV cannot use the configured second resource pool at some moments. Three vehicle speed thresholds are used as an example for description in the following.

1. When a vehicle speed of the RV is greater than 40 km/h and less than or equal to 120 km/h (for example, a speed is limited to 120 km/h on a road), the RV may use all resource pools configured for the RV to send periodic status information. Therefore, as shown in FIG. 1-1, the RV may send the FCW signal by using a corresponding first resource pool, and a location of a resource used to send the FCW signal may be determined according to a location of a resource by using which the RV sends the status information of the RV at a previous moment; and so on.

2. When a vehicle speed of the RV is greater than 30 km/h and less than or equal to 40 km/h, the RV cannot use a first resource pool configured for the RV in some periods. As shown in FIG. 1-2, the first resource pool at intervals of one period is unavailable to the RV, but a second resource pool configured for the RV is still available. Therefore, it is equivalent to that two second resource pools are correspondingly configured for the RV when a first resource pool is configured for the RV. Therefore, the RV may consecutively send the FCW signal twice by using the two second resource pools. In addition, when the RV does not need to send the status information of the RV, the RV may still use the first resource pool configured for the RV, to send the FCW signal.

3. When a vehicle speed of the RV is less than or equal to 30 km/h, the RV cannot use all first resource pools configured for the RV in multiple consecutive periods. As shown in FIG. 1-3, the first resource pool in last three periods in every four periods is unavailable to the RV, but a second resource pool configured for the RV is still available. Therefore, it is equivalent to that four second resource pools are correspondingly configured for the RV when a first resource pool is configured for the RV. Therefore, the RV may consecutively send the FCW signal for four times by using the four second resource pools. In addition, when the RV does not need to send the status information of the RV, the RV may still use the first resource pool of the RV to send the FCW signal.

Likewise, a policy that the RV selects a location of a resource for sending the FCW signal when a vehicle speed of the HV changes may be proposed.

It may be understood that the RV and the HV are interchangeable, for example, when the RV suddenly decelerates or changes a direction, the HV needs to send a corresponding FCW signal to the RV. For details, refer to the process in which the RV sends the FCW signal to the HV, and the details are not described again.

Referring to FIG. 2, the following describes a signal receiving method in an embodiment of the present invention from a perspective of receiving a notification signal. The method includes the following step:

201. A second device receives, on a target transmission resource, a notification signal sent by a first device.

The target transmission resource includes: a third transmission resource determined according to a first transmission resource, or a fourth transmission resource determined according to a second transmission resource. The first transmission resource is a resource by using which the first device sends first status information of the first device, and the second transmission resource is a resource by using which the second device sends second status information of the second device.

The second device resumes, according to the notification signal, a normal operation corresponding to a parameter that is in the second status information and that meets a warning triggering condition.

In this embodiment of the present invention, the second device receives, by using the third transmission resource or the fourth transmission resource, the notification signal sent by the first device, so that a location of a transmission resource by using which the second device sends the notification signal is learned in advance, that is, the notification signal may be directly received at the location. This effectively reduces a receiving delay and improves receiving reliability and accuracy. In addition, the second device performs a corresponding operation in a timely manner according to the notification signal, so as to avoid collision with the first device in a time period or a distance.

Optionally, based on the embodiment corresponding to FIG. 2, in a first optional embodiment of this embodiment of the present invention, a relationship between the third transmission resource and the first transmission resource or a relationship between the fourth transmission resource and the second transmission resource includes one of the following cases:

1. A first frequency domain location $P_1$ corresponding to the target transmission resource in a resource pool is obtained according to the following formula:

$P_1=\mathrm{mod}(P_2+\mathrm{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

2. A sixth time domain location $T_1$ corresponding to the target transmission resource in a resource pool is obtained according to the following formula:

$T_1=\mathrm{mod}(T_2+\mathrm{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

3. An eleventh frequency domain location $P_3$ corresponding to the target transmission resource in a resource pool is obtained according to the following formula:

$P_3=\mathrm{mod}(P_4+\mathrm{Delta}, N_2)$, where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is obtained according to the following formula:

$T_3=\mathrm{mod}(T_4+\mathrm{Delta}, M_2)$, where $T_4$ is a time domain location corresponding to the first transmission resource in the resource pool, Delta is an increment, and $M_2$ is a total quantity of available moment locations in the resource pool.

4. A thirteenth frequency domain location $P_5$ corresponding to the target transmission resource in a resource pool is obtained according to the following formula:

$P_5=\mathrm{mod}(P_6+\mathrm{Delta}, N_3)$, where $P_6$ is a frequency domain location corresponding to the second transmission resource in the resource pool, Delta is an increment, and $N_3$ is a total quantity of available frequency locations in the resource pool; and a fourteenth time domain location $T_5$ corresponding to the target transmission resource in the resource pool is obtained according to the following formula:

$T_5=\mathrm{mod}(T_6+\mathrm{Delta}, M_3)$, where $T_6$ is a time domain location corresponding to the second transmission resource in the resource pool, Delta is an increment, and $M_3$ is a total quantity of available moment locations in the resource pool.

Optionally, based on the embodiment corresponding to FIG. 2 or the first optional embodiment, in a second optional embodiment of this embodiment of the present invention, that a second device receives, on a target transmission resource, a notification signal sent by a first device includes:

within each period in which the first transmission resource is continuously used by the first device, receiving, by the second device, the notification signal on the third transmission resource; or within each period in which the second transmission resource is continuously used by the second device, receiving, by the second device, the notification signal on the fourth transmission resource.

Optionally, based on the embodiment corresponding to FIG. 2, or the first or the second optional embodiment, in a third optional embodiment of this embodiment of the present invention, before that a second device receives, on a target transmission resource, a notification signal sent by a first device, the method further includes:

descrambling, by the second device, the notification signal according to any two of a first identifier, a second identifier, or a third identifier, to obtain a descrambled notification signal, where the first identifier is an identifier of the first device, the second identifier is an identifier of the notification signal, the third identifier is an identifier of the second device, and the first device is a device that sends the notification signal; and that a second device receives, on a target transmission resource, a notification signal sent by a first device includes:

receiving, by the second device, the descrambled notification signal on the target transmission resource.

Optionally, based on the third optional embodiment, in a fourth optional embodiment of this embodiment of the present invention, the second device generates a scrambling code sequence according to a scrambling code seed, and descrambles the notification signal by using the scrambling code sequence, to obtain a descrambled notification signal, where the scrambling code seed is generated according to any two identifiers of the first identifier, the second identifier, or the third identifier.

Optionally, based on the fourth optional embodiment, in a fifth optional embodiment of this embodiment of the present invention, the notification signal includes a verification code field, and the descrambling the notification signal by using the scrambling code sequence includes:

descrambling, by the second device, the verification code field by using the scrambling code sequence.

The foregoing provides examples to describe the signal sending and receiving method in the embodiments of the present invention. The following describes a first device 30 that performs the foregoing signal sending method. Referring to FIG. 3, the first device 30 includes:

a processing module 301, configured to determine the target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device; and a transmission module 302, configured to send a notification signal to the second device on the target transmission resource determined by the processing module 301.

In this embodiment of the present invention, after the processing module 301 determines the first transmission resource and the second transmission resource, the transmission module 302 sends the notification signal on the third transmission resource or the fourth transmission resource, so that the second device can directly receive the notification signal on the third transmission resource or the fourth transmission resource. This reduces an unnecessary receiving delay, and further improves reliability of receiving the notification signal by the second device.

Optionally, based on the embodiment corresponding to FIG. 3, in a first optional embodiment of this embodiment of the first invention, a frequency corresponding to a transmission resource is a frequency domain location corresponding to the transmission resource in a resource pool, a moment corresponding to the transmission resource is a time domain location corresponding to the transmission resource in the resource pool, and a first frequency domain location $P_1$ corresponding to the target transmission resource in the resource pool is as follows:

$P_1=\mathrm{mod}(P_2+\mathrm{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

Optionally, based on the embodiment corresponding to FIG. 3, in a second optional embodiment of this embodiment of the present invention, a sixth time domain location $T_1$ corresponding to the target transmission resource in a resource pool is as follows:

$T_1=\mathrm{mod}(T_2+\mathrm{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

Optionally, based on the embodiment corresponding to FIG. 3, in a third optional embodiment of this embodiment of the present invention, when the target transmission resource is the third transmission resource, an eleventh frequency domain location $P_3$ corresponding to the target transmission resource in a resource pool is as follows:

$P_3=\mathrm{mod}(P_4+\mathrm{Delta}, N_2)$, where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3=\mathrm{mod}(T_4+\mathrm{Delta}, M_2)$, where $T_4$ is a time domain location corresponding to the first transmission resource in the resource pool, Delta is an increment, and $M_2$ is a total quantity of available moment locations in the resource pool; or when the target transmission resource is the fourth transmission resource, a thirteenth frequency domain location $P_5$ corresponding to the target transmission resource in a resource pool is as follows:

$P_5=\mathrm{mod}(P_6+\mathrm{Delta}, N_3)$, where $P_6$ is a frequency domain location corresponding to the second transmission resource in the resource pool, Delta is an increment, and $N_3$ is a total quantity of available frequency locations in the resource pool; and a fourteenth time domain location $T_5$ corresponding to the target transmission resource in the resource pool is as follows:

$T_5=\mathrm{mod}(T_6+\mathrm{Delta}, M_3)$, where $T_6$ is a time domain location corresponding to the second transmission resource in the resource pool, Delta is an increment, and $M_3$ is a total quantity of available moment locations in the resource pool.

Optionally, based on any one of the embodiment corresponding to FIG. 3, or the first to the third optional embodiments, in a fourth optional embodiment of this embodiment of the present invention, the transmission module 302 is further configured to:

within each period in which the first transmission resource does not change, send the notification signal by using the third transmission resource; or within each period in which the second transmission resource does not change, send the notification signal by using the fourth transmission resource.

Optionally, based on any one of the embodiment corresponding to FIG. 3, or the first to the fourth optional embodiments, in a fifth optional embodiment of this embodiment of the present invention, the processing module 301 is further configured to:

descramble the notification signal according to any two of a first identifier, a second identifier, or a third identifier, to obtain a descrambled notification signal, where the first identifier is an identifier of the first device, the second identifier is an identifier of the notification signal, the third identifier is an identifier of the second device, and the first device is a device that sends the notification signal; and the transmission module 302 is specifically configured to:

send, to the second device by using the third transmission resource or the fourth transmission resource, the scrambled notification signal obtained by the processing module.

Optionally, based on the fifth optional embodiment, in a sixth optional embodiment of this embodiment of the present invention, the processing module 301 is specifically configured to:

generate a scrambling code sequence according to a scrambling code seed, and scramble the notification signal by using the scrambling code sequence, to obtain the scrambled notification signal, where the scrambling code seed is generated according to any two identifiers of the first identifier of the first device, the second identifier of the notification signal, or the third identifier of the second device.

Optionally, based on the fifth optional embodiment, in a sixth optional embodiment of this embodiment of the present invention, when the notification signal includes a verification code field, the processing module 301 is specifically configured to:

scramble the verification code field by using the scrambling code sequence.

The following describes a second device 40 that performs the foregoing signal receiving and processing method. Referring to FIG. 4, the second device 40 includes:

a processing module 401, configured to determine a target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which the second device sends second status information of the second device; and a transmission module 402, configured to receive, on the target transmission resource determined by the processing module 401, a notification signal sent by the first device.

In this embodiment of the present invention, after the processing module 401 determines the third transmission resource or the fourth transmission resource, the transmission module 402 receives, on the third transmission resource or the fourth transmission resource, the notification signal sent by the first device, so that a location of a transmission resource by using which the second device sends the notification signal is learned in advance, that is, the notification signal can be directly received at the location. This effectively reduces a receiving delay and improves receiving reliability and accuracy. In addition, the second device performs a corresponding operation in a timely manner according to the notification signal, so as to avoid collision with the first device in a time period or a distance.

Optionally, based on the embodiment corresponding to FIG. 4, in a first optional embodiment of this embodiment of the present invention, a first frequency domain location $P_1$ corresponding to the target transmission resource in a resource pool is as follows:

$P_1=\text{mod}(P_2+\text{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

Optionally, based on the embodiment corresponding to FIG. 4, in a second optional embodiment of this embodiment of the present invention, a sixth time domain location $T_1$ corresponding to the target transmission resource in a resource pool is as follows:

$T_1=\text{mod}(T_2+\text{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

Optionally, based on the embodiment corresponding to FIG. 4, in a third optional embodiment of this embodiment of the present invention, when the target transmission resource is the third transmission resource, an eleventh frequency domain location $P_3$ corresponding to the target transmission resource in a resource pool is as follows:

$P_3=\text{mod}(P_4+\text{Delta}, N_2)$, where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3=\text{mod}(T_4+\text{Delta}, M_2)$, where $T_4$ is a time domain location corresponding to the first transmission resource in the resource pool, Delta is an increment, and $M_2$ is a total quantity of available moment locations in the resource pool; or when the target transmission resource is the third transmission resource, a thirteenth frequency domain location $P_5$ corresponding to the target transmission resource in a resource pool is as follows:

$P_5 = \text{mod}(P_6 + \text{Delta}, N_3)$, where $P_6$ is a frequency domain location corresponding to the second transmission resource in the resource pool, Delta is an increment, and $N_3$ is a total quantity of optional frequencies in the resource pool; and a fourteenth time domain location $T_5$ corresponding to the target transmission resource in the resource pool is as follows:

$T_5 = \text{mod}(T_6 + \text{Delta}, M_3)$, where $T_6$ is a time domain location corresponding to the second transmission resource in the resource pool, Delta is an increment, and $M_3$ is a total quantity of available moments in the resource pool.

Optionally, based on any one of the embodiment corresponding to FIG. 4, or the first to the third optional embodiments, in a fourth optional embodiment of this embodiment of the present invention, the transmission module 402 is specifically configured to:

within each period in which the first transmission resource by using which the first device sends the first status information does not change, receive the notification signal on the third transmission resource; or within each period in which the second transmission resource by using which the second device sends the second status information does not change, receive the notification signal on the fourth transmission resource.

Optionally, based on any one of the embodiment corresponding to FIG. 4, or the first to the fourth optional embodiments, in a fifth optional embodiment of this embodiment of the present invention, the processing module 401 is further configured to:

descramble the notification signal according to any two of a first identifier, a second identifier, or a third identifier, to obtain a descrambled notification signal, where the first identifier is an identifier of the first device, the second identifier is an identifier of the notification signal, the third identifier is an identifier of the second device, and the first device is a device that sends the notification signal; and the transmission module 402 is specifically configured to:

receive, on the target transmission resource, the descrambled notification signal obtained by the processing module.

Optionally, based on the fifth optional embodiment, in a sixth optional embodiment of this embodiment of the present invention, the processing module 401 is specifically configured to:

generate a scrambling code sequence according to a scrambling code seed, and descramble the notification signal by using the scrambling code sequence, where the scrambling code seed is generated according to any two identifiers of the first identifier, the second identifier, or the third identifier.

Optionally, based on the sixth optional embodiment, in a seventh optional embodiment of this embodiment of the present invention, when the notification signal includes a verification code field, the processing module 401 is specifically configured to:

descramble the verification code field by using the scrambling code sequence. The present invention further provides a computer storage medium. The present invention further provides a computer storage medium. The medium stores a program. When the program is being executed, some or all of the steps in the signal sending and receiving method are included.

The present invention further provides a computer storage medium. The medium stores a program. When the program is being executed, some or all of the steps in the signal sending method performed by the first device are included, or some or all of the steps in the signal receiving method performed by the second device are included.

FIG. 5 is another schematic structural diagram of a first device 50 according to an embodiment of the present invention. The first device 50 may include at least one network interface or another communications interface, at least one receiver 501, at least one transmitter 502, at least one processor 503, and a memory 504, so as to implement communication connection between these apparatuses. At least one network interface (which may be wired or wireless) may implement communication connection between a system gateway and at least one other network element by using the Internet, a wide area network, a local area network, a metropolitan area network, or the like.

The memory 504 may include a read-only memory and a random access memory, and provides an instruction and data for the processor 503. A part of the memory 504 may further include a high-speed random access memory (RAM, Random Access Memory), and may further include a nonvolatile memory (non-volatile memory).

The memory 504 stores the following elements: an executable module or a data structure, or a subset thereof, or an extended set thereof:

an operation instruction, including various operation instructions and used to implement various operations; and an operating system, including various system programs and used to implement various basic services and process a hardware-based task.

In this embodiment of the present invention, the processor 503 performs the following operations by invoking the operation instruction (the operation instruction may be stored in the operating system) stored in the memory 504:

determining a target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which a second device sends second status information of the second device; and sending, by using the transmitter 502, a notification signal to the second device on the target transmission resource.

Optionally, a frequency corresponding to a transmission resource is a frequency domain location corresponding to the transmission resource in a resource pool, a moment corresponding to the transmission resource is a time domain location corresponding to the transmission resource in the resource pool, and a first frequency domain location $P_1$ corresponding to the target transmission resource in the resource pool is as follows:

$P_1 = \text{mod}(P_2 + \text{Delta}, N_1)$, where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

Optionally, a sixth time domain location $T_1$ corresponding to the target transmission resource in a resource pool is as follows:

$T_1 = \mod(T_2 + \text{Delta}, M_1)$, where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

Optionally, when the target transmission resource is the third transmission resource, an eleventh frequency domain location $P_3$ corresponding to the target transmission resource in a resource pool is as follows:

$P_3 = \mod(P_4 + \text{Delta}, N_2)$, where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3 = \mod(T_4 + \text{Delta}, M_2)$, where $T_4$ is a time domain location corresponding to the first transmission resource in the resource pool, Delta is an increment, and $M_2$ is a total quantity of available moment locations in the resource pool; or when the target transmission resource is the fourth transmission resource, a thirteenth frequency domain location $P_5$ corresponding to the target transmission resource in a resource pool is as follows:

$P_5 = \mod(P_6 + \text{Delta}, N_3)$, where $P_6$ is a frequency domain location corresponding to the second transmission resource in the resource pool, Delta is an increment, and $N_3$ is a total quantity of available frequency locations in the resource pool; and a fourteenth time domain location $T_5$ corresponding to the target transmission resource in the resource pool is as follows:

$T_5 = \mod(T_6 + \text{Delta}, M_3)$, where $T_6$ is a time domain location corresponding to the second transmission resource in the resource pool, Delta is an increment, and $M_3$ is a total quantity of available moment locations in the resource pool.

In some implementations, the processor 503 may further perform the following step:

within each period in which the first transmission resource does not change, sending, by using the transmitter 502, the notification signal by using the third transmission resource; or within each period in which the second transmission resource does not change, sending, by using the transmitter 502, the notification signal by using the fourth transmission resource.

In some implementations, the processor 503 may further perform the following steps:

descrambling the notification signal according to any two of a first identifier, a second identifier, or a third identifier, to obtain a descrambled notification signal, where the first identifier is an identifier of the first device, the second identifier is an identifier of the notification signal, the third identifier is an identifier of the second device, and the first device is a device that sends the notification signal; and sending, by using the transmitter 502 to the second device by using the third transmission resource or the fourth transmission resource, the scrambled notification signal obtained by the processing module.

In some implementations, the processor 503 may further perform the following step:

generating a scrambling code sequence according to a scrambling code seed, and scrambling the notification signal by using the scrambling code sequence, to obtain a scrambled notification signal, where the scrambling code seed is generated according to any two identifiers of the first identifier of the first device, the second identifier of the notification signal, or the third identifier of the second device.

In some implementations, the processor 503 may further perform the following step:

scrambling the verification code field by using the scrambling code sequence.

FIG. 6 is another schematic structural diagram of a second device 60 according to an embodiment of the present invention. The second device 60 may include at least one network interface or another communications interface, at least one receiver 601, at least one transmitter 602, at least one processor 603, and a memory 604, so as to implement communication connection between these apparatuses. At least one network interface (which may be wired or wireless) may implement communication connection between a system gateway and at least one other network element by using the Internet, a wide area network, a local area network, a metropolitan area network, or the like.

The memory 604 may include a read-only memory and a random access memory, and provides an instruction and data for the processor 603. A part of the memory 604 may further include a high-speed random access memory (RAM, Random Access Memory), and may further include a nonvolatile memory (non-volatile memory).

The memory 604 stores the following elements: an executable module or a data structure, or a subset thereof, or an extended set thereof:

an operation instruction, including various operation instructions and used to implement various operations; and an operating system, including various system programs and used to implement various basic services and process a hardware-based task.

In this embodiment of the present invention, the processor 603 performs the following operations by invoking the operation instruction (the operation instruction may be stored in the operating system) stored in the memory 604:

determining a target transmission resource, where the target transmission resource includes: a third transmission resource determined according to a first transmission resource, or a fourth transmission resource determined according to a second transmission resource, the first transmission resource is a resource by using which the first device sends first status information of the first device, and the second transmission resource is a resource by using which a second device sends second status information of the second device; and receiving, on the target transmission resource by using the receiver 601, a notification signal sent by the first device.

Optionally, a first frequency domain location $P_1$ corresponding to the target transmission resource in a resource pool is as follows:

$P_1$=mod($P_2$+Delta, $N_1$), where $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, the second location is a time domain location corresponding to the third transmission resource in the resource pool, and the third location is a time domain location corresponding to the first transmission resource in the resource pool; or when $P_2$ is a frequency domain location corresponding to the second transmission resource in the resource pool, a fourth location is the same as a fifth location, the fourth location is a time domain location corresponding to the fourth transmission resource in the resource pool, and the fifth location is a time domain location corresponding to the second transmission resource in the resource pool.

Optionally, a sixth time domain location $T_1$ corresponding to the target transmission resource in a resource pool is as follows:

$T_1$=mod($T_2$+Delta, $M_1$), where $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, the seventh location is a frequency domain location corresponding to the third transmission resource in the resource pool, and the eighth location is a frequency domain location corresponding to the first transmission resource in the resource pool; or when $T_2$ is a time domain location corresponding to the second transmission resource in the resource pool, a ninth location is the same as a tenth location, the ninth location is a frequency domain location corresponding to the fourth transmission resource in the resource pool, and the tenth location is a frequency domain location corresponding to the second transmission resource in the resource pool.

Optionally, when the target transmission resource is the third transmission resource, an eleventh frequency domain location $P_3$ corresponding to the target transmission resource in a resource pool is as follows:

$P_3$=mod($P_4$+Delta, $N_2$), where $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3$=mod($T_4$+Delta, $M_2$), where $T_4$ is a time domain location corresponding to the first transmission resource in the resource pool, Delta is an increment, and $M_2$ is a total quantity of available moment locations in the resource pool; or when the target transmission resource is the third transmission resource, a thirteenth frequency domain location $P_5$ corresponding to the target transmission resource in a resource pool is as follows:

$P_5$=mod($P_6$+Delta, $N_3$), where $P_6$ is a frequency domain location corresponding to the second transmission resource in the resource pool, Delta is an increment, and $N_3$ is a total quantity of optional frequencies in the resource pool; and a fourteenth time domain location $T_5$ corresponding to the target transmission resource in the resource pool is as follows:

$T_5$=mod($T_6$+Delta, $M_3$), where $T_6$ is a time domain location corresponding to the second transmission resource in the resource pool, Delta is an increment, and $M_3$ is a total quantity of available moments in the resource pool.

In some implementations, the processor 603 may further perform the following step:

within each period in which the first transmission resource by using which the first device sends the first status information does not change, receiving the notification signal on the third transmission resource by using the receiver 601; or within each period in which the second transmission resource by using which the second device sends the second status information does not change, receiving the notification signal on the fourth transmission resource by using the receiver 601.

In some implementations, the processor 603 may further perform the following steps:

descrambling the notification signal according to any two of a first identifier, a second identifier, or a third identifier, to obtain a descrambled notification signal, where the first identifier is an identifier of the first device, the second identifier is an identifier of the notification signal, the third identifier is an identifier of the second device, and the first device is a device that sends the notification signal; and receiving, on the target transmission resource by using the receiver 601, the descrambled notification signal obtained by the processing module.

In some implementations, the processor 603 may further perform the following step:

generating a scrambling code sequence according to a scrambling code seed, and descrambling the notification signal by using the scrambling code sequence, where the scrambling code seed is generated according to any two identifiers of the first identifier, the second identifier, or the third identifier.

In some implementations, when the notification signal includes a verification code field, the processor 603 may further perform the following step:

descrambling the verification code field by using the scrambling code sequence.

To improve reliability of the notification signal and make the second device successfully receive the notification signal, an embodiment of the present invention further provides a signal processing method. Referring to FIG. 7, the method includes the following step:

701. A first device scrambles a notification signal by using any two of a first identifier, a second identifier, or a third identifier.

A scrambled notification signal may be obtained after the scrambling.

The first identifier is an identifier of the first device, the second identifier is an identifier of the notification signal, and the third identifier is an identifier of a second device. The second device is a device that receives the notification signal.

In this embodiment of the present invention, scrambling processing is performed on the notification signal, so that the notification signal is directional. That is, only at least one specific device can correctly receive the notification signal. In addition, this improves reliability and security of the notification signal.

Optionally, based on the embodiment corresponding to FIG. 7, in a first optional embodiment of this embodiment of the present invention, that a first device scrambles a notification signal by using any two of a first identifier, a second identifier, or a third identifier includes:

generating, by the first device, a scrambling code sequence according to a scrambling code seed, and scrambling the notification signal by using the scrambling code sequence, to obtain a scrambled notification signal, so that only the second device can descramble the notification signal, where the scrambling code seed is generated according to any two of the first identifier, the second identifier, or the third identifier. In this embodiment, the scrambling code seed may be generated according to another parameter, so as to further enhance the reliability of the notification signal. A specific implementation is not limited in this specification.

1. A generation formula of generating the scrambling code seed is as follows:

The generation formula may be $c_{init}$=(HV ID) XOR (Message ID), or $c_{init}$=(HV ID) XOR (RV ID), or $c_{init}$=(RV ID) XOR (Message ID), or the like, where XOR is an exclusive OR operator. A specific generation formula of the scrambling code sequence is not limited.

2. A formula of generating the scrambling code sequence c(n) by using the scrambling code seed is as follows:

$$c(n)=[x_1(n+N_C)+x_2(n+N_C)] \bmod 2;$$

$$(n+31)=[x_1(n+3)+x_1(n)] \bmod 2; \text{ and}$$

$$x_2(n+31)=[x_2(n+3)+x_2(n+2)+x_2(n+1)+x_2(n)] \bmod 2;$$
where $$x_1(0)=1, x_1(n)=0, n=1,2,\ldots,30 \text{ and } c_{init}=\Sigma_{i=0}^{30} x_2(i) \cdot 2^i.$$

It may be understood that the scrambling code seed may be the scrambling code sequence. This is only a form change performed to facilitate scrambling processing. An exclusive OR operation may be used to improve the security and directionality of the notification signal.

Optionally, based on the first optional embodiment, in a second optional embodiment of this embodiment of the present invention, the notification signal includes a verification code field, and the scrambling the notification signal by using the scrambling code sequence, to obtain a scrambled notification signal includes:

scrambling, by the first device, the verification code field by using the scrambling code sequence, to obtain the scrambled notification signal.

A formula of scrambling the verification code (CRC, Cyclic Redundancy Check) field may be $CRC_{mask}=(c_{init})$ XOR (CRC). Alternatively, the CRC field may be scrambled in another manner. This is not limited in this specification.

In the above, the first device scrambles the notification signal, to improve the reliability and the directionality of the notification signal. The following describes a signal processing method in an embodiment of the present invention from a perspective that a second device descrambles a notification signal sent by a first device. Referring to FIG. 8, the method includes the following step:

801. The second device descrambles a notification signal by using any two of a first identifier, a second identifier, or a third identifier.

The first identifier is an identifier of the first device, the second identifier is an identifier of the notification signal, and the third identifier is an identifier of the second device. The first device is a device that sends the notification signal.

In this embodiment of the present invention, descrambling processing is performed on the notification signal sent by the first device. The notification signal can be successfully received after being successfully descrambled. This represents that the notification signal is directional. That is, only at least one specific device can correctly receive the notification signal. In addition, this improves reliability and security of the notification signal.

Optionally, based on the embodiment corresponding to FIG. 8, in a first optional embodiment of this embodiment of the present invention, that the first device descrambles a notification signal by using any two of a first identifier, a second identifier, or a third identifier includes:

generating, by the second device, a scrambling code sequence according to a scrambling code seed, and descrambling the notification signal by using the scrambling code sequence, where the scrambling code seed is generated according to any two of the first identifier, the second identifier, or the third identifier.

For a specific formula of generating the scrambling code seed and a specific formula of generating the scrambling code sequence, refer to the first optional embodiment of the embodiment corresponding to FIG. 3. Details are not described herein again.

Optionally, based on the first optional embodiment, in a second optional embodiment of this embodiment of the present invention, the notification signal includes a verification code field, and the descrambling the notification signal by using the scrambling code sequence includes:

descrambling, by the second device, the verification code field by using the scrambling code sequence. The notification signal can be correctly received after being successfully descrambled. Likewise, a formula of descrambling the CRC field may be $CRC=(c_{init})$ XOR $(CRC_{mask})$, where $c_{init}$ is the generated scrambling code seed. Alternatively, the CRC field may be descrambled in another manner. This is not limited in this specification.

The following describes a first device 90 that performs the foregoing signal processing method. Referring to FIG. 9, the second device 90 includes:

a processing module 901, configured to scramble a notification signal according to any two of a first identifier, a second identifier, or a third identifier, where the first identifier is an identifier of the first device, the second identifier is an identifier of the notification signal, the third identifier is an identifier of a second device, and the second device is a device that receives the notification signal.

In this embodiment of the present invention, the processing module 901 performs scrambling processing on the notification signal, so that the notification signal is directional. That is, only at least one specific device can correctly receive the notification signal. In addition, this improves reliability and security of the notification signal.

Optionally, based on the embodiment corresponding to FIG. 9, in a first optional embodiment of this embodiment of the present invention, the processing module 901 is specifically configured to:

generate a scrambling code sequence according to a scrambling code seed, and descramble the notification signal by using the scrambling code sequence, where the scrambling code seed is generated according to any two of the first identifier, the second identifier, or the third identifier.

Optionally, based on the first optional embodiment, in a second optional embodiment of this embodiment of the present invention, the processing module 901 is specifically configured to:

scramble the verification code field by using the scrambling code sequence.

The following describes a second device 100 that performs the foregoing signal processing method. Referring to FIG. 10, the second device 100 includes:

a processing module 1001, configured to descramble a notification signal according to any two of a first identifier, a second identifier, or a third identifier, where the first identifier is an identifier of a first device, the second identifier is an identifier of the notification signal, the third identifier is an identifier of the second device, and the first device is a device that sends the notification signal.

In this embodiment of the present invention, the processing module 1001 performs descrambling processing on the notification signal sent by the first device. The notification signal can be successfully received after being successfully descrambled. This means that the notification signal is directional. That is, only at least one specific device can correctly receive the notification signal. In addition, this improves reliability and security of the notification signal.

Optionally, based on the embodiment corresponding to FIG. 10, in a first optional embodiment of this embodiment of the present invention, the processing module 1001 is specifically configured to:

generate a scrambling code sequence according to a scrambling code seed, and descramble the notification signal by using the scrambling code sequence, where the scrambling code seed is generated according to any two of the first identifier, the second identifier, or the third identifier.

Optionally, based on the first optional embodiment, in a second optional embodiment of this embodiment of the present invention, the processing module 1001 is specifically configured to:

descramble the verification code field by using the scrambling code sequence.

In the foregoing embodiments, the description of each embodiment has respective focuses. For a part that is not described in detail in an embodiment, refer to related descriptions in other embodiments.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit or processor, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing describes in detail a signal sending and receiving method and a related device provided in the present invention. In this specification, specific examples are used to describe the principle and the implementations of the present invention, and the description of the embodiments is only intended to help understand the method and the core idea of the present invention. In addition, persons of ordinary skill in the art can make modifications to specific implementations and application scopes according to the idea of the present invention. In conclusion, the content of this specification shall not be construed as a limitation on the present invention.

What is claimed is:

1. A signal receiving method, wherein the method comprises:

receiving, by a second device on a target transmission resource, a notification signal sent by a first device, wherein the target transmission resource comprises a third transmission resource determined according to a first transmission resource or a fourth transmission resource determined according to a second transmission resource, wherein the first transmission resource is a resource used by the first device to send first status information of the first device, and wherein the second transmission resource is a resource used by the second device to send second status information of the second device, wherein the receiving, by the second device on the target transmission resource, the notification signal sent by the first device comprises:

within each period in which the first transmission resource used by the first device to send the first status information does not change, receiving, by the second device, the notification signal on the third transmission resource; or within each period in which the second transmission resource used by the second device to send the second status information does not change, receiving, by the second device, the notification signal on the fourth transmission resource.

2. The method according to claim 1, wherein a first frequency domain location $P_1$ corresponding to the target transmission resource in a resource pool is as follows:

$P_1 = \mod(P_2 + \text{Delta}, N_1)$, wherein $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, wherein the second location is a time domain location corresponding to the third transmission resource in the resource pool, and wherein the third location is a time domain location corresponding to the first transmission resource in the resource pool; or when $P_2$ is a frequency domain location corresponding to the second transmission resource in the resource pool, a fourth location is the same as a fifth location, wherein the fourth location is a time domain location corresponding to the fourth transmission resource in the resource pool, and wherein the fifth location is a time domain location corresponding to the second transmission resource in the resource pool.

3. The method according to claim 1, wherein a sixth time domain location $T_1$ corresponding to the target transmission resource in a resource pool is as follows:

$T_1 = \mod(T_2 + \text{Delta}, M_1)$, wherein $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, wherein the seventh location is a frequency domain location corresponding to the third transmission resource in the resource pool, and wherein the eighth location is a frequency domain location corresponding to the first transmission resource in the resource pool; or when $T_2$ is a time domain location corresponding to the second transmission resource in the resource pool, a ninth location is the same as a tenth location, wherein the ninth location is a frequency domain location corresponding to the fourth transmission resource in the resource pool, and wherein the tenth location is a frequency domain location corresponding to the second transmission resource in the resource pool.

4. A first device, wherein the first device comprises:
at least one processor, the at least one processor configured to determine a target transmission resource, wherein the target transmission resource comprises a third transmission resource determined according to a first transmission resource or a fourth transmission resource determined according to a second transmission resource, wherein the first transmission resource is a resource used by the first device to send first status information of the first device, and wherein the second transmission resource is a resource used by a second device to send second status information of the second device; and at least one transmitter coupled to the at least one processor, the at least one transmitter configured to send a notification signal to the second device on the target transmission resource determined by the at least one processor, wherein the at least one transmitter is further configured to:
within each period in which the first transmission resource does not change, send the notification signal by using the third transmission resource; or
within each period in which the second transmission resource does not change, send the notification signal by using the fourth transmission resource.

5. The first device according to claim 4, wherein a frequency corresponding to a transmission resource is a frequency domain location corresponding to the transmission resource in a resource pool, wherein a moment corresponding to the transmission resource is a time domain location corresponding to the transmission resource in the resource pool, and wherein a first frequency domain location $P_1$ corresponding to the target transmission resource in the resource pool is as follows:

$P_1 = \mod(P_2 + \text{Delta}, N_1)$, wherein $P_2$ is a frequency domain location corresponding to the first transmission resource or the second transmission resource in the resource pool, Delta is an increment, $N_1$ is a total quantity of available frequency locations in the resource pool, and mod is a modulo function; and when $P_2$ is a frequency domain location corresponding to the first transmission resource in the resource pool, a second location is the same as a third location, wherein the second location is a time domain location corresponding to the third transmission resource in the resource pool, and wherein the third location is a time domain location corresponding to the first transmission resource in the resource pool; or when $P_2$ is a frequency domain location corresponding to the second transmission resource in the resource pool, a fourth location is the same as a fifth location, wherein the fourth location is a time domain location corresponding to the fourth transmission resource in the resource pool, and wherein the fifth location is a time domain location corresponding to the second transmission resource in the resource pool.

6. The first device according to claim 4, wherein a sixth time domain location $T_1$ corresponding to the target transmission resource in a resource pool is as follows:

$T_1 = \mod(T_2 + \text{Delta}, M_1)$, wherein $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, wherein the seventh location is a frequency domain location corresponding to the third transmission resource in the resource pool, and wherein the eighth location is a frequency domain location corresponding to the first transmission resource in the resource pool; or when $T_2$ is a time domain location corresponding to the second transmission resource in the resource pool, a ninth location is the same as a tenth location, wherein the ninth location is a frequency domain location corresponding to the fourth transmission resource in the resource pool, and wherein the tenth location is a frequency domain location corresponding to the second transmission resource in the resource pool.

7. The first device according to claim 4, wherein
when the target transmission resource is the third transmission resource:
   an eleventh frequency domain location $P_3$ corresponding to the target transmission resource in a resource pool is as follows:
      $P_3=\text{mod}(P_4+\text{Delta}, N_2)$, wherein $P_4$ is a frequency domain location corresponding to the first transmission resource in the resource pool, Delta is an increment, $N_2$ is a total quantity of available frequency locations in the resource pool, and mod is a modulo function; and
   a twelfth time domain location $T_3$ corresponding to the target transmission resource in the resource pool is as follows:
      $T_3=\text{mod}(T_4+\text{Delta}, M_2)$, wherein $T_4$ is a time domain location corresponding to the first transmission resource in the resource pool, Delta is an increment, and $M_2$ is a total quantity of available moment locations in the resource pool; or
when the target transmission resource is the fourth transmission resource:
   a thirteenth frequency domain location $P_5$ corresponding to the target transmission resource in a resource pool is as follows:
      $P_5=\text{mod}(P_6+\text{Delta}, N_3)$, wherein $P_6$ is a frequency domain location corresponding to the second transmission resource in the resource pool, Delta is an increment, and $N_3$ is a total quantity of available frequency locations in the resource pool; and
   a fourteenth time domain location $T_5$ corresponding to the target transmission resource in the resource pool is as follows:
      $T_5=\text{mod}(T_6+\text{Delta}, M_3)$, wherein $T_6$ is a time domain location corresponding to the second transmission resource in the resource pool, Delta is an increment, and $M_3$ is a total quantity of available moment locations in the resource pool.

8. The first device according to claim 4, wherein the at least one processor is further configured to:
   scramble the notification signal according to any two of a first identifier, a second identifier, or a third identifier, to obtain a scrambled notification signal, wherein the first identifier is an identifier of the first device, the second identifier is an identifier of the notification signal, the third identifier is an identifier of the second device, and the first device is a device that sends the notification signal; and
   the at least one transmitter is configured to:
      send, to the second device by using the third transmission resource or the fourth transmission resource, the scrambled notification signal obtained by the at least one processor.

9. The first device according to claim 8, wherein the at least one processor is configured to:
   generate a scrambling code sequence according to a scrambling code seed, wherein the scrambling code seed is generated according to any two identifiers of the first identifier of the first device, the second identifier of the notification signal, or the third identifier of the second device; and
   scramble the notification signal by using the scrambling code sequence to obtain the scrambled notification signal.

10. The first device according to claim 9, wherein when the notification signal comprises a verification code field, the at least one processor is configured to:
   scramble the verification code field by using the scrambling code sequence.

11. A second device, wherein the second device comprises:
   at least one processor, the at least one processor configured to determine a target transmission resource, wherein the target transmission resource comprises a third transmission resource determined according to a first transmission resource or a fourth transmission resource determined according to a second transmission resource, wherein the first transmission resource is a resource used by a first device to send first status information of the first device, and wherein the second transmission resource is a resource used by the second device to send second status information of the second device; and
   at least one receiver coupled to the at least one processor, the at least one receiver configured to receive, on the target transmission resource determined by the at least one processor, a notification signal sent by the first device,
   wherein the at least one receiver is configured to:
      within each period in which the first transmission resource does not change, receive the notification signal on the third transmission resource; or
      within each period in which the second transmission resource does not change, receive the notification signal on the fourth transmission resource.

12. The second device according to claim 11, wherein a first frequency domain location $P_1$ corresponding to the target transmission resource in a resource pool is as follows:
   $P_1=\text{mod}(P_2+\text{Delta}, N_1)$, wherein $P_2$ is a frequency domain location corresponding to the first transmission resource or the second transmission resource in the resource pool, Delta is an increment, $N_1$ is a total quantity of available frequency locations in the resource pool, and mod is a modulo function; and
   when $P_2$ is a frequency domain location corresponding to the first transmission resource in the resource pool, a second location is the same as a third location, wherein the second location is a time domain location corresponding to the third transmission resource in the resource pool, and wherein the third location is a time domain location corresponding to the first transmission resource in the resource pool; or
   when $P_2$ is a frequency domain location corresponding to the second transmission resource in the resource pool, a fourth location is the same as a fifth location, wherein the fourth location is a time domain location corresponding to the fourth transmission resource in the resource pool, and wherein the fifth location is a time domain location corresponding to the second transmission resource in the resource pool.

13. The second device according to claim 11, wherein a sixth time domain location $T_1$ corresponding to the target transmission resource in a resource pool is as follows:
   $T_1=\text{mod}(T_2+\text{Delta}, M_1)$, wherein $T_2$ is a time domain location corresponding to the first transmission resource or the second transmission resource in the resource pool, Delta is an increment, $M_1$ is a total quantity of available moment locations in the resource pool, and mod is a modulo function; and when $T_2$ is a time domain location corresponding to the first transmission resource in the resource pool, a seventh location is the same as an eighth location, wherein the seventh location is a frequency domain location corresponding to the third transmission resource in the resource pool, and wherein the eighth location is a frequency domain location corresponding to the first transmission resource in the resource pool; or when $T_2$ is a time domain location corresponding to the second transmission resource in the resource pool, a ninth location is the same as a tenth location, wherein the ninth location is a frequency domain location corresponding to the fourth transmission resource in the resource pool, and wherein the tenth location is a frequency domain location corresponding to the second transmission resource in the resource pool.

14. The second device according to claim 11, wherein when the target transmission resource is the third transmission resource:

an eleventh frequency domain location $P_3$ corresponding to the target transmission resource in a resource pool is as follows:

$P_3=\mathrm{mod}(P_4+\mathrm{Delta}, N_2)$, wherein $P_4$ is a frequency domain location corresponding to the first transmission resource in the resource pool, Delta is an increment, $N_2$ is a total quantity of available frequency locations in the resource pool, and mod is a modulo function; and a twelfth time domain location $T_3$ corresponding to the target transmission resource in the resource pool is as follows:

$T_3=\mathrm{mod}(T_4+\mathrm{Delta}, M_2)$, wherein $T_4$ is a time domain location corresponding to the first transmission resource in the resource pool, Delta is an increment, and $M_2$ is a total quantity of available moment locations in the resource pool; or when the target transmission resource is the third transmission resource;

a thirteenth frequency domain location $P_5$ corresponding to the target transmission resource in a resource pool is as follows:

$P_5=\mathrm{mod}(P_6+\mathrm{Delta}, N_3)$, wherein $P_6$ is a frequency domain location corresponding to the second transmission resource in the resource pool, Delta is an increment, and $N_3$ is a total quantity of optional frequencies in the resource pool; and a fourteenth time domain location $T_5$ corresponding to the target transmission resource in the resource pool is as follows:

$T_5=\mathrm{mod}(T_6+\mathrm{Delta}, M_3)$, wherein $T_6$ is a time domain location corresponding to the second transmission resource in the resource pool, Delta is an increment, and $M_3$ is a total quantity of available moments in the resource pool.

15. The second device according to claim 11, wherein the at least one processor is further configured to:

descramble the notification signal according to any two of a first identifier, a second identifier, or a third identifier, to obtain a descrambled notification signal, wherein the first identifier is an identifier of the first device, the second identifier is an identifier of the notification signal, the third identifier is an identifier of the second device, and the first device is a device that sends the notification signal; and the at least one receiver is configured to:

receive, from the at least one processor, the descrambled notification signal obtained by the at least one processor.

16. The second device according to claim 15, wherein the at least one processor is configured to:

generate a scrambling code sequence according to a scrambling code seed, wherein the scrambling code seed is generated according to any two identifiers of the first identifier, the second identifier, or the third identifier; and descramble the notification signal by using the scrambling code sequence.

17. The second device according to claim 16, wherein when the notification signal comprises a verification code field, the at least one processor is configured to:

descramble the verification code field by using the scrambling code sequence.

* * * * *